(12) United States Patent
Hasuda

(10) Patent No.: US 10,567,680 B2
(45) Date of Patent: Feb. 18, 2020

(54) SHUTTER DEVICE AND IMAGE-CAPTURING DEVICE

(71) Applicant: NIKON CORPORATION, Tokyo (JP)

(72) Inventor: Masanori Hasuda, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 267 days.

(21) Appl. No.: 15/127,990

(22) PCT Filed: Mar. 24, 2015

(86) PCT No.: PCT/JP2015/058896
§ 371 (c)(1),
(2) Date: Jan. 30, 2017

(87) PCT Pub. No.: WO2015/146971
PCT Pub. Date: Oct. 1, 2015

(65) Prior Publication Data
US 2017/0155854 A1  Jun. 1, 2017

(30) Foreign Application Priority Data

Mar. 26, 2014  (JP) .................................. 2014-063363

(51) Int. Cl.
*H04N 5/353* (2011.01)
*H04N 5/225* (2006.01)
(Continued)

(52) U.S. Cl.
CPC .............. *H04N 5/353* (2013.01); *G03B 9/42* (2013.01); *H04N 5/2254* (2013.01); *H04N 5/2353* (2013.01); *H04N 5/374* (2013.01)

(58) Field of Classification Search
CPC .... H04N 5/353; H04N 5/2353; H04N 5/2254; H04N 5/374; G03B 9/42; G03B 9/36
See application file for complete search history.

(56) References Cited

U.S. PATENT DOCUMENTS

2012/0033961 A1* 2/2012 Chung ..................... G03B 9/08
396/463
2012/0128343 A1 5/2012 Niwamae
(Continued)

FOREIGN PATENT DOCUMENTS

JP  H05-196995 A  8/1993
JP  H11-174525 A  7/1999
(Continued)

OTHER PUBLICATIONS

Jun. 30, 2015 Search Report issued in International Patent Application No. PCT/JP2015/058896.
(Continued)

*Primary Examiner* — Abdelaaziz Tissire
(74) *Attorney, Agent, or Firm* — Oliff PLC

(57) ABSTRACT

A shutter device includes: a first light shielding member disposed at a position further frontward relative to an image-capturing surface of an image sensor, which blocks a light flux from a subject by traveling along a predetermined direction of travel; and a second light shielding member disposed at a position further frontward relative to the image-capturing surface of the image sensor, which blocks the light flux by traveling along the direction of travel, wherein: at least either a length of a light shielding range of the first light shielding member, measured along the direction of travel, or a length of a light shielding range of the second light shielding member, measured along the direction of travel, is smaller than a length of the image-capturing surface along the direction of travel.

11 Claims, 10 Drawing Sheets

(51) Int. Cl.
*H04N 5/374* (2011.01)
*H04N 5/235* (2006.01)
*G03B 9/42* (2006.01)

(56) References Cited

U.S. PATENT DOCUMENTS

| | | | | |
|---|---|---|---|---|
| 2012/0229687 A1* | 9/2012 | Lee | ........................ | H04N 5/2353 348/333.11 |
| 2012/0229698 A1* | 9/2012 | Tsubono | .............. | H04N 5/2353 348/363 |
| 2012/0328280 A1* | 12/2012 | Nakano | ................... | G03B 9/36 396/489 |
| 2014/0010526 A1* | 1/2014 | Takahashi | ................ | G03B 9/42 396/469 |
| 2014/0016023 A1* | 1/2014 | Min | ..................... | H04N 5/2353 348/362 |
| 2014/0247387 A1* | 9/2014 | Nakano | ................ | H04N 5/2353 348/367 |
| 2015/0138419 A1* | 5/2015 | Lee | ........................ | H04N 5/2353 348/333.11 |
| 2015/0309387 A1* | 10/2015 | Nemoto | ................... | G03B 9/14 348/294 |
| 2017/0351162 A1* | 12/2017 | Hasuda | ..................... | G03B 9/36 |
| 2017/0351163 A1* | 12/2017 | Hasuda | ..................... | G03B 9/36 |
| 2018/0252987 A1* | 9/2018 | Takahashi | ................ | G03B 9/14 |

FOREIGN PATENT DOCUMENTS

| | | |
|---|---|---|
| JP | 2003-131114 A | 5/2003 |
| JP | 2006-084826 A | 3/2006 |
| JP | 2007-267326 A | 10/2007 |
| JP | 2007-282128 A | 10/2007 |
| JP | 2009-088825 A | 4/2009 |
| JP | 2010-107635 A | 5/2010 |
| JP | 2012-113115 A | 6/2012 |

OTHER PUBLICATIONS

Nov. 19, 2019 Office Action issued in Japanese Patent Application No. 2016-510378.

* cited by examiner

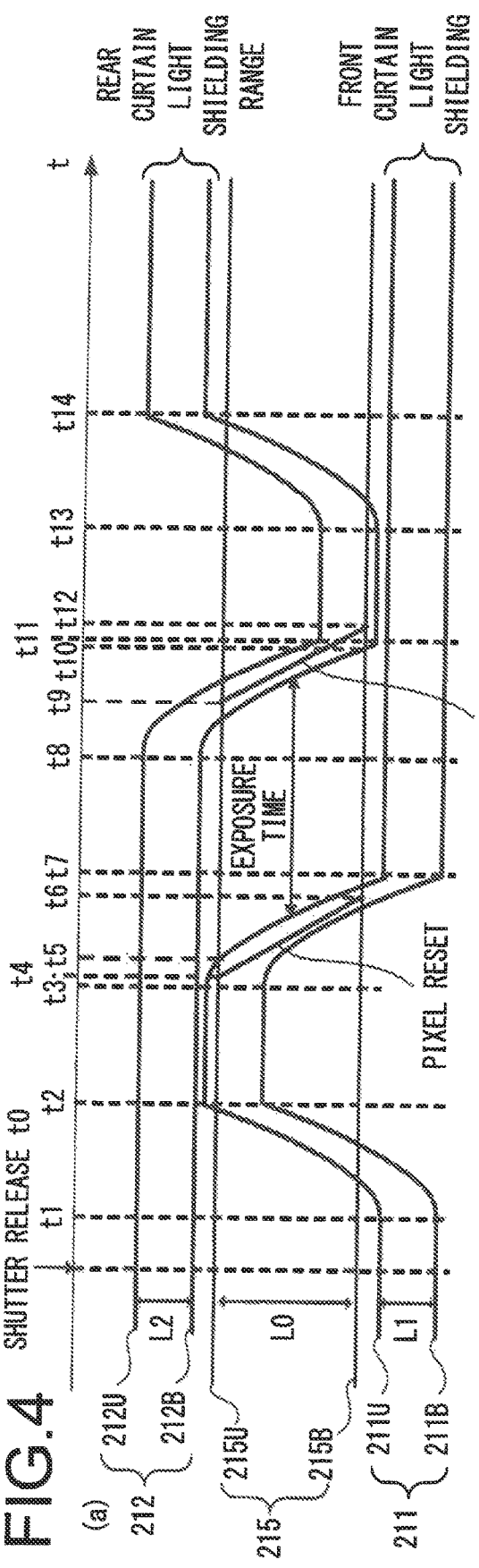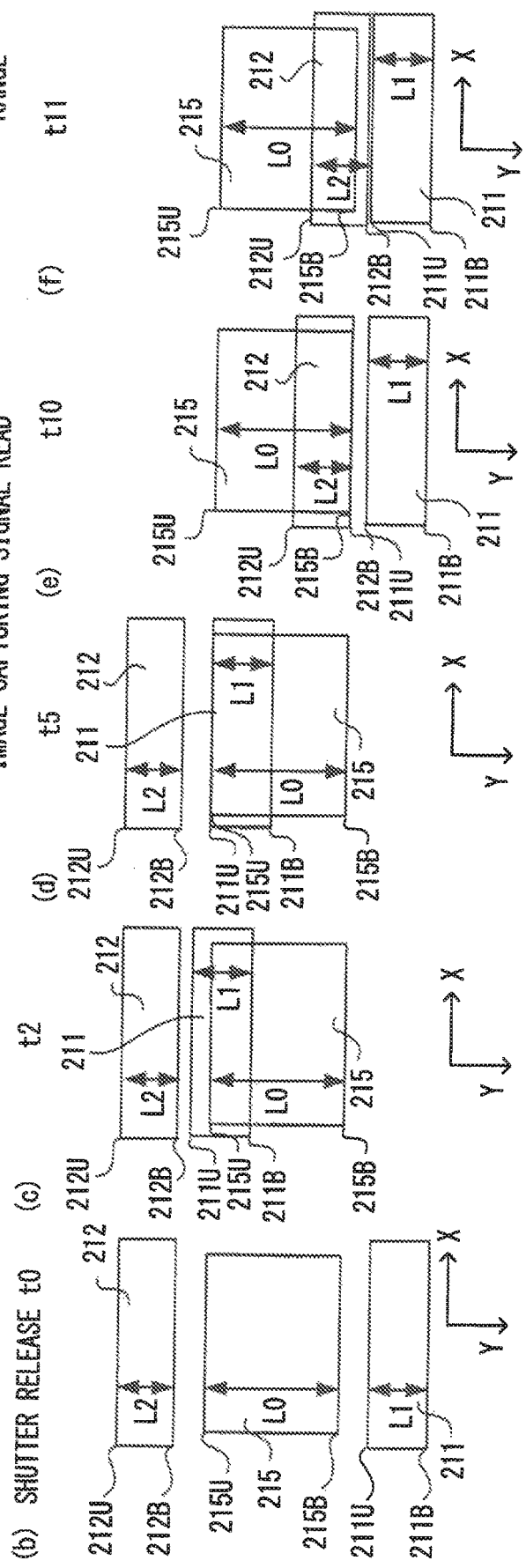
FIG. 4

FIG.6
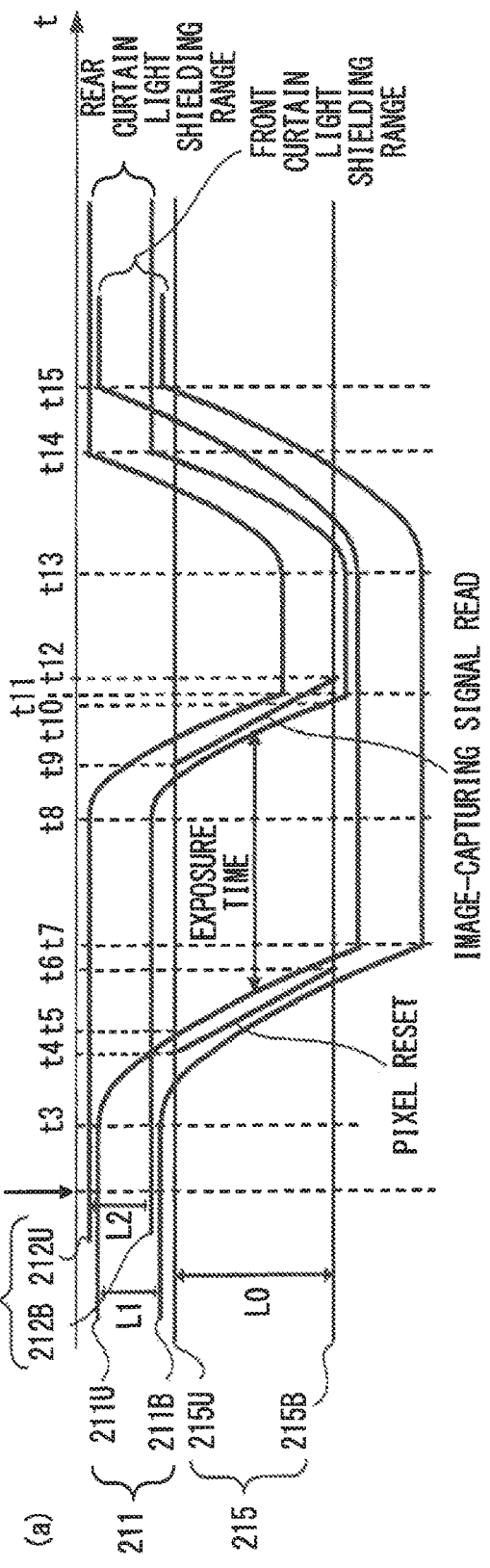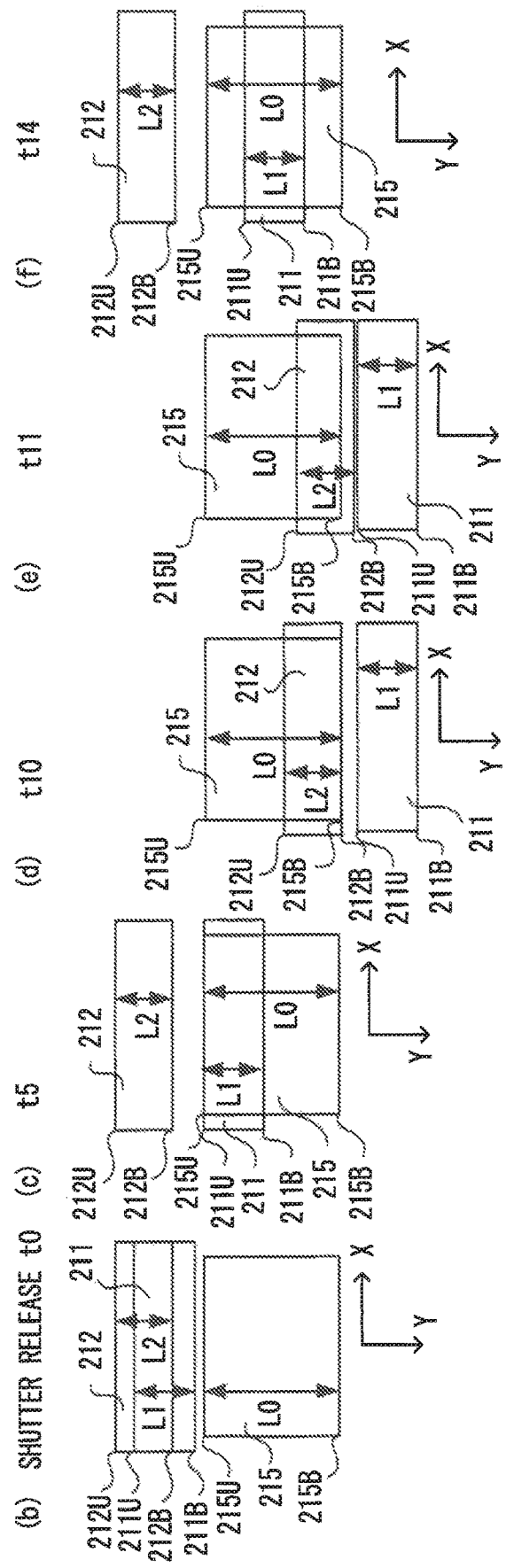

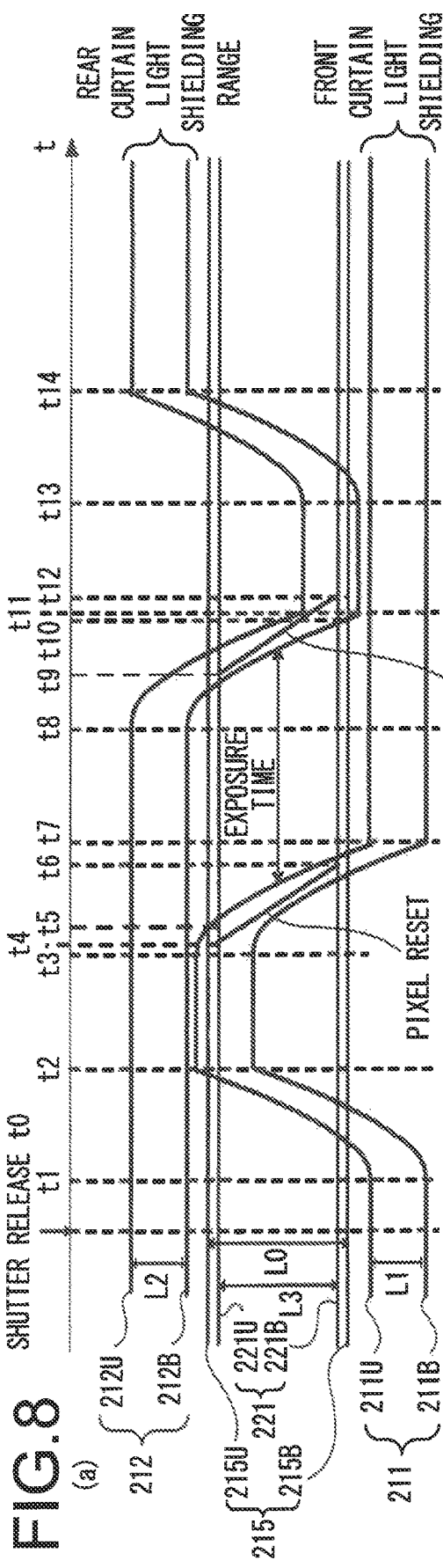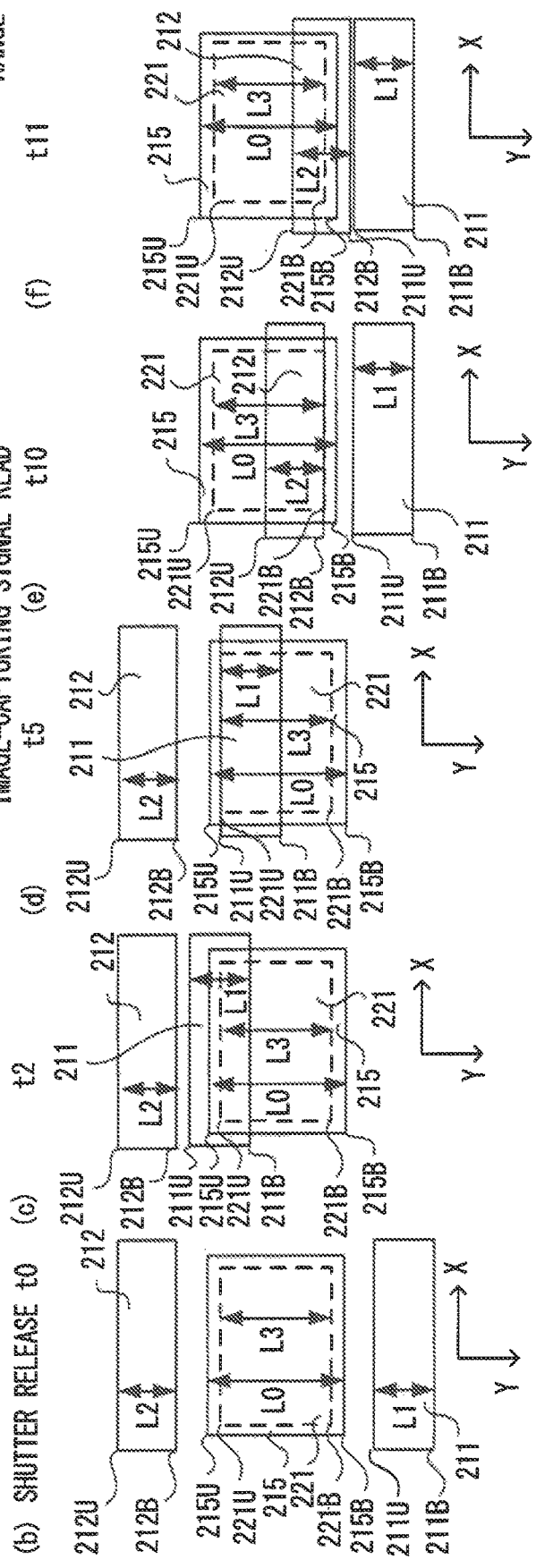
FIG. 8

SHUTTER DEVICE AND IMAGE-CAPTURING DEVICE

TECHNICAL FIELD

The present invention relates to a shutter device and an image-capturing device.

BACKGROUND ART

There are focal plane shutters (such as that disclosed in PTL 1) known in the related art, structured so that an opening formed at a shutter base plate can be shielded from subject light over its entire range with a front curtain having a plurality of blades or a rear curtain having a plurality of blades.

CITATION LIST

Patent Literature

PTL 1: Japanese Laid Open Patent Publication No. H11-174525

SUMMARY OF INVENTION

Technical Problem

There are problems arising due to the need to increase the number of, or the aerial size of the blades, so as to shield the entire opening area from light, such as an increase in power consumption resulting from the increase in the weight of parts, reduced durability and lower curtain speed, that remain to be addressed.

Solution to Problem

According to the 1st aspect of the present invention, a shutter device comprises: a first light shielding member disposed at a position further frontward relative to an image-capturing surface of an image sensor, which blocks a light flux from a subject by traveling along a predetermined direction of travel; and a second light shielding member disposed at a position further frontward relative to the image-capturing surface of the image sensor, which blocks the light flux by traveling along the direction of travel, wherein: at least either a length of a light shielding range of the first light shielding member, measured along the direction of travel, or a length of a light shielding range of the second light shielding member, measured along the direction of travel, is smaller than a length of the image-capturing surface along the direction of travel.

According to the 2nd aspect of the present invention, a shutter device comprises: a substrate member at which an opening through which a light flux from a subject is guided to an image sensor is formed; a first light shielding member that blocks the light flux by passing across the opening in a direction of travel along a plane parallel to an image-capturing surface of the image sensor; and a second light shielding member that blocks the light flux by passing across the opening in the direction of travel along a plane parallel to the image-capturing surface of the image sensor, wherein; at least either a length of a light shielding range of the first light shielding member, measured along the direction of travel, or a length of a light shielding range of the second light shielding member, measured along the direction of travel, is smaller than a length of the opening along the direction of travel.

According to the 3rd aspect of the present invention, it is preferred that in the shutter device according to the 2nd aspect, a length of the image-capturing surface of the image sensor along the direction of travel is smaller than the length of the opening along the direction of travel; and at least either the length of the light shielding range of the first light shielding member, measured along the direction of travel, or the length of the light shielding range of the second light shielding member, measured along the direction of travel, is smaller than the length of the image-capturing surface along the direction of travel.

According to the 4th aspect of the present invention, it is preferred that in the shutter device according to any one of the 1st through 3rd aspects, at least either the first light shielding member or the second light shielding member is constituted with a single light shielding blade.

According to the 5th aspect of the present invention, an image-capturing device, comprises: the shutter device according to any one of the 1st through 4th aspects, the image sensor having a plurality of pixels arrayed in a matrix pattern; and a control unit that controls a reset and an image-capturing signal read executed in each of pixel rows at the image sensor, wherein: the control unit engages the image sensor in the reset executed in each of pixel rows in correspondence to travel of the first light shielding member along the direction of travel, or engages the image sensor in the image-capturing signal read executed in each of pixel rows in correspondence to travel of the second light shielding member along the direction of travel.

According to the 6th aspect of the present invention, it is preferred that in the image-capturing device according to the 5th aspect, the control unit executes control so that the reset is executed on a pixel row in an area shielded from the light flux by the first light shielding member.

According to the 7th aspect of the present invention, it is preferred that in the image-capturing device according to the 6th aspect, the shutter device further comprises a first drive mechanism that causes the first light shielding member to travel at a first velocity along the direction of travel; and the length of the light shielding range of the first light shielding member measured along the direction of travel is greater than a length determined based upon the first velocity and a length of time required to execute the reset in each of pixel rows.

According to the 8th aspect of the present invention, it is preferred that in the image-capturing device according to the 7th aspect, the Shutter device further comprises a first detection unit that detects a position of the first light shielding member traveling along the direction of travel; and the control unit controls timing with which the reset executed in each of pixel rows starts based upon the position detected by the first detection unit.

According to the 9th aspect of the present invention, it is preferred that in the image-capturing device according to any one of the 5th through 8th aspect, the control unit executes control so that the image-capturing signal read is executed on a pixel row in an area shielded from the light flux by the second light shielding member.

According to the 10th aspect of the present invention, it is preferred that in the image-capturing device according to claim 9, the shutter device further comprises a second drive mechanism that causes the second light shielding member to travel at a second velocity along the direction of travel; and the length of the light shielding range of the second light shielding member Measured along the direction of travel is greater than a length determined based upon the second velocity, a length of time required to execute the image-capturing signal read in each of pixel rows and the length of the image-capturing surface along the direction of travel.

According to the 11th aspect of the present invention, it is preferred that in the image-capturing device according to claim 10, the shutter device further comprises a second detection unit that detects a position of the second light shielding member traveling along the direction of travel; and the control unit controls timing with which the image-capturing signal read executed in each of pixel rows starts based upon the position detected by the second detection unit.

According to the 12th aspect of the present invention, a shutter device comprises: a substrate member at which an opening through which a light flux from a subject is guided to an image sensor is formed; a first light shielding member that blocks the light flux by passing across the opening further on a side on which the light flux advances as incident light relative to the image sensor; and a second light shielding member that blocks the light flux by passing across the opening at a later time point than the first light shielding member, further on the side on which the light flux advances as incident light relative to the image sensor, wherein: the first light shielding member partially shields the opening from light at a position at which the first light shielding member starts traveling.

According to the 13th aspect of the present invention, it is preferred that in the shutter device according to the 12th aspect, during the image sensor being engaged in a photographing operation, the first light shielding member travels while partially shielding the opening from light.

According to the 14th aspect of the present invention, it is preferred that the shutter device according to the 13th aspect further comprises: an energizing member that imparts a force so as to enable the first light shielding member to travel, wherein: the first light shielding member partially shields the opening from light at a charge position at which the energizing member is charged.

According to the 15th aspect of the present invention, it is preferred that in the shutter device according to the 13th or 14th aspect, the second light shielding member partially shields the opening from light at a position at which travel of the second light shielding member ends.

According to the 16th aspect of the present invention, an image-capturing device, comprises: the shutter device according to the 13th or 14th aspect, the image sensor having a plurality of pixels arrayed in a matrix pattern; and a control unit that controls a reset and an image-capturing signal read executed in each of pixel rows at the image sensor, wherein: the control unit engages the image sensor in the reset executed in each of pixel rows in correspondence to travel of the first light shielding member along the direction of travel, or engages the image sensor in the image-capturing signal read executed in each of pixel rows in correspondence to travel of the second light shielding member along the direction of travel.

According to the 17th aspect of the present invention, a shutter device comprises: a substrate member at which an opening through which a light flux from a subject is guided to an image sensor is formed; a first light shielding member that blocks the light flux by passing across the opening further on a side on which the light flux advances as incident light relative to the image sensor; and a second light shielding member that blocks the light flux by passing across the opening at a later time point than the first light shielding member, further on the side on which the light flux advances as incident light relative to the image sensor, wherein: the second light shielding member partially shields the opening from light at a position at which travel of the second light shielding member ends.

According to the 18th aspect of the present invention, it is preferred that in the shutter device according to the 17th aspect, during the image sensor being engaged in a photographing operation, the second light shielding member travels while partially shielding the opening from light.

According to the 19th aspect of the present invention, an image-capturing device, comprises: the shutter device according to the 17th or 18th aspect, the image sensor having a plurality of pixels arrayed in a matrix pattern; and a control unit that controls a reset and an image-capturing signal read executed in each of pixel rows at the image sensor, wherein: the control unit engages the image sensor in the reset executed in each of pixel rows in correspondence to travel of the first light shielding member along the direction of travel, or engages the image sensor in the image-capturing signal read executed in each of pixel rows in correspondence to travel of the second light shielding member along the direction of travel.

Advantageous Effects of Invention

The present invention makes it possible to reduce power consumption and improve the durability and the curtain speed by setting at least either the length of the light shielding range of the first light shielding means or the length of the light shielding range of the second light shielding means, measured along a direction of travel, to a value smaller than the length of the image-capturing surface measured along the direction of travel.

DESCRIPTION OF EMBODIMENTS

First Embodiment

In reference to drawings, an image-capturing device equipped with the shutter device achieved in the first embodiment of the present invention will be described.

Figure 1:
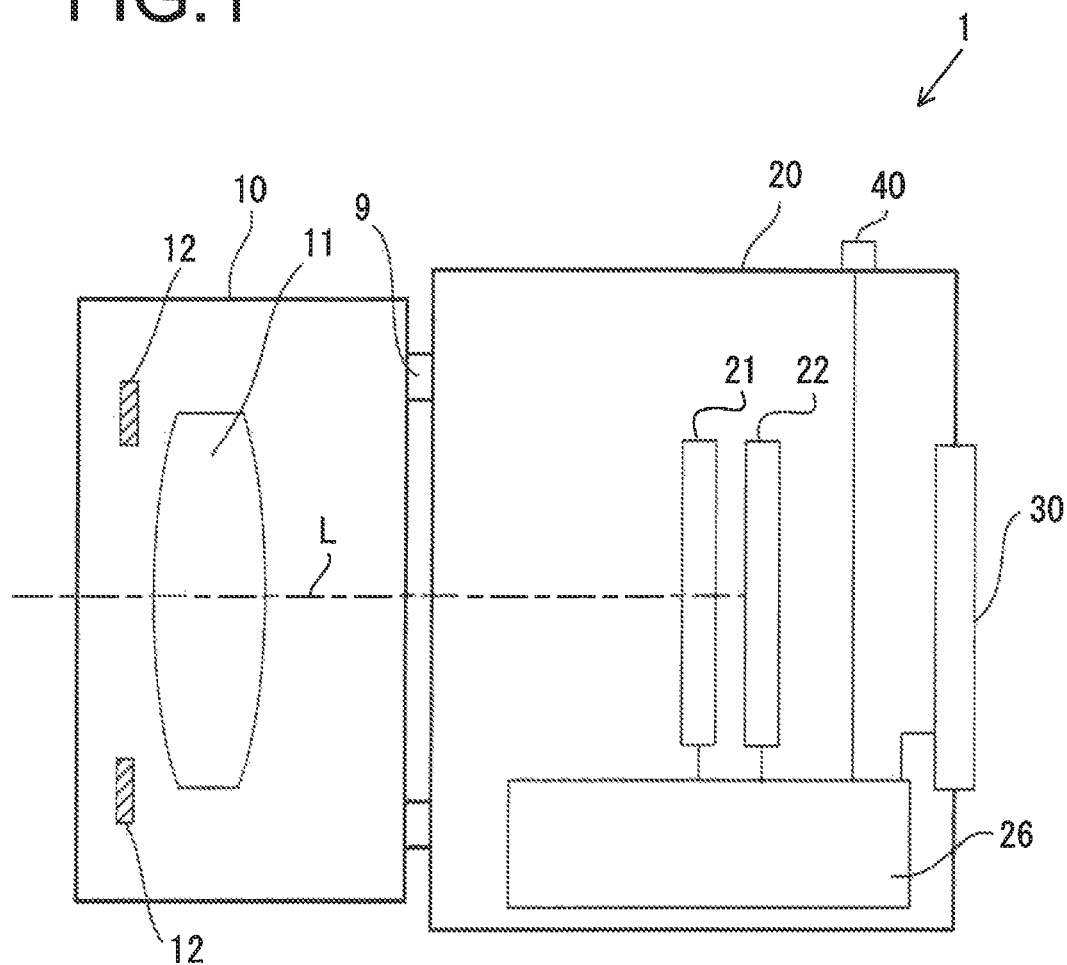
FIG. 1 A diagram illustrating an essential structure of the image-capturing device achieved in an embodiment of the present invention FIG. 2 A plan view schematically illustrating the structure of the shutter device achieved in an embodiment FIG. 3 A diagram schematically illustrating the relationship among the lower end and upper end positions of the rear curtain blade, the position of the opening and the length of time required to read image-capturing signals from each pixel row at the image sensor FIG. 4 A timing chart pertaining to the operation executed at the shutter device in a first embodiment FIG. 5 A flowchart of the operation executed in the image-capturing device in the first embodiment FIG. 6 A timing chart pertaining to the operation executed at the shutter device in a second embodiment FIG. 7 A plan view schematically illustrating the relationship between the opening and the image-capturing area at the image sensor in a third embodiment FIG. 8 A timing chart pertaining to the operation executed at the shutter device in the third embodiment FIG. 9 A diagram schematically illustrating the structure of the shutter device achieved in a fourth embodiment FIG. 10 A flowchart of the operation executed in the image-capturing device in the fourth embodiment

FIG. 1 illustrates an essential structure of a digital camera 1 achieved as the first embodiment of the image-capturing device. The digital camera 1, commonly referred to as a mirrorless camera, comprises a camera body 20 and a lens barrel 10 that is interchangeably mounted at the camera body 20 via a lens mount 9.

The lens barrel 10 includes an image-forming optical system 11 and an aperture 12. The image-forming optical system 11 is an optical system via which a subject image is formed at a predetermined image-forming plane, and is constituted with a plurality of lenses, including a focusing lens. As a lens drive motor (not shown) is engaged in operation, the focusing lens is caused to move forward/backward along a direction in which an optical axis L extends. It is to be noted that for purposes of simplification, the image-forming optical system 11 is schematically illustrated as a single lens in FIG. 1. Through the aperture 12, the amount of light flux passing through the image-forming optical system 11, i.e., the amount of incident light, is regulated.

A shutter device 21, an image sensor 22 and a control device 26 are disposed inside the camera body 20. A rear monitor 30, configured with a display device such as a liquid crystal display unit, is disposed at the rear surface of the camera body 20. An operation unit 40 is disposed at the camera body 20.

The image sensor 22 may be, for instance, a CMOS image sensor with numerous pixels arrayed in a matrix pattern, and is disposed so that its image-capturing surface is positioned at the image-forming plane of the image-forming optical system 11. The image sensor 22 captures a subject image formed by the image-forming optical system 11 at its image-capturing surface via the shutter device 21, and outputs image-capturing signals to the control device 26. It is to be noted that although not shown in FIG. 1, various optical filters, such as an infrared filter, are disposed at the image-capturing surface of the image sensor 22. The plurality of pixels constituting the image sensor 22 are arrayed in a two-dimensional pattern along the direction in which pixel rows extend (i.e., along the X axis in FIG. 2, as will be explained later) and along the direction in which pixel columns extend perpendicular to the pixel rows (i.e., along the Y axis in FIG. 2, as will be explained later). The pixels are reset and image-capturing signals are read with timing that is varied for each pixel row made up with pixels taking different pixel column positions.

The shutter device 21, disposed toward the front (toward the subject) with respect to the image sensor 22, is of a type widely known as a focal plane shutter that blocks a light flux originating from the subject and advancing toward the image sensor 22 by driving the shutter in response to a drive signal provided from the control device 26, as will be described later. It is to be noted that the shutter device 21 will be explained in detail later.

The control device 26, constituted with a microprocessor, its peripheral circuits and the like, controls various units constituting the digital camera 1 by executing a control program read from a storage medium (e.g., a flash memory, not shown) where it is stored in advance. The control device 26 generates image data expressing the subject image by executing various types of image processing on image-capturing signals output from the image sensor 22 and records the image data thus generated into a portable storage medium (such as a memory card, not shown). The control device 26 controls the operations of the shutter device 21 and the image sensor 22, as will be described in detail later.

It is to be noted that the control device 26 may be configured with an electronic circuit having functions equivalent to those of the control program.

The operation unit 40 includes various switches, each disposed in correspondence to one of various types of operation members operated by the user, and outputs an operation signal corresponding to an operation performed at an operation member to the control device 26. Such operation members include, for instance, a shutter release button, a menu button operated to display a menu screen at the rear monitor 30, a cross key operated to select various settings and the like, an OK button operated to confirm settings and the like selected via the cross key, and a mode selector button operated to switch the digital camera 1 from a photograph mode to a reproduce mode and vice versa.

The following is a detailed description of the shutter device 21 achieved in the embodiment of the present invention.

Figure 2:
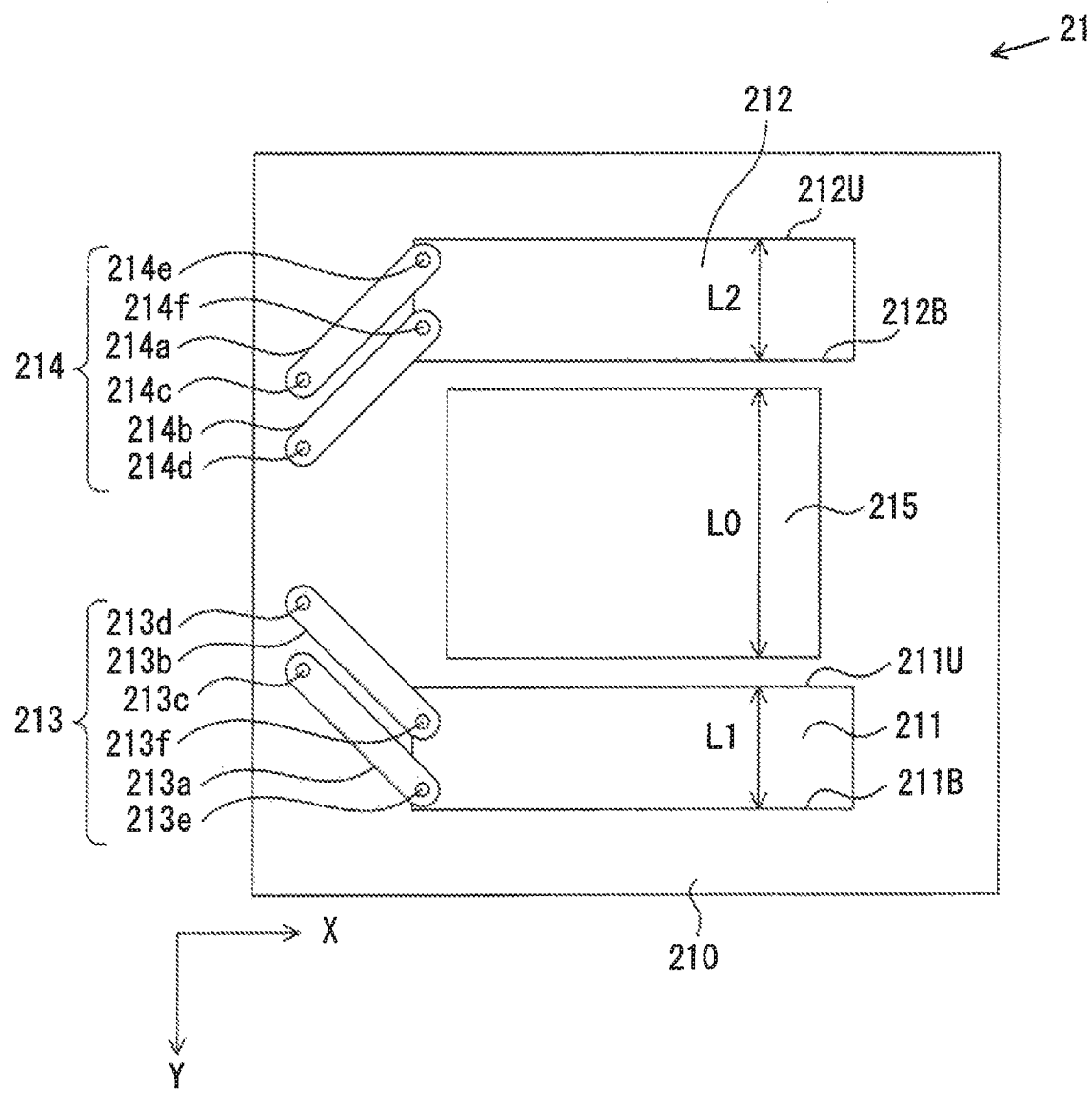

FIG. 2 is a plan view schematically illustrating the shutter device 21. It is to be noted that in order to facilitate the explanation, a coordinate system assuming an X axis and a Y axis is set as shown in the figure. The shutter device 21 includes a substrate 210, a front curtain 211, a rear curtain 212, a front curtain drive member 213 and a rear curtain drive member 214. The substrate 210 is fixed inside the camera body 20 and includes an opening 215 via which the image sensor 22 is exposed with a subject light flux. The opening 215 is formed in a rectangular shape enclosed by two sides extending along the X axis and two sides extending along the Y axis. In the following description, the side of the opening 215 located on the −side along the Y axis, will be referred to as an upper end 215U, the side of the opening 215 located on the +side along the Y axis, will be referred to as a lower end 215B and the distance between the upper end 250U and the lower end 215B, measured along the Y axis will be referred to as a length L0.

The front curtain 211 is constituted with a single blade, which may be, for instance, formed in a rectangular shape with two sides thereof extending along the X axis and other sides thereof extending along the Y axis. A length L1 measured along the Y axis (along the direction in which the shutter blades in the front curtain 211 and the rear curtain 212 travel), i.e., the distance between an upper end 211U representing the side of the front curtain 211 located on the −side along the Y axis and extending along the X axis, and a lower end 211B representing the side of the front curtain 211 located on the +side along the Y axis and extending along the X axis, is smaller than the length L0 of the opening 215 along the Y axis. This means that the front curtain 211 is only able to partially shield the opening 215, i.e., the light shielding range of the front curtain 211 along the direction of travel is less than the length of the opening 215 along the direction of travel. The front curtain 211, which cannot shield the opening 215 in its entirety, is made to move (travel) along the Y axis by the front curtain drive member 213 as will be described later while its upper end 211U sustains parallelism with the upper end 215U and the lower end 215B of the opening 215. Since the pixel rows at the image sensor 22 extend along the X axis as explained earlier, the pixel resetting direction runs perpendicular to the direction in which the front curtain 211 travels. It is to be noted that while the embodiment is described by assuming that the front curtain 211 travels over the front surface (the side toward the subject) of the opening 215, the present invention may be adopted in a Mode that includes a curtain traveling over the rear surface (the side toward the image sensor 22) of the opening 215.

The rear curtain 212 is constituted with a single blade, which may be, for instance, formed in a rectangular shape with two sides thereof extending along the X axis and other sides thereof extending along the Y axis. A length L2 measured along the Y axis (along the direction of travel mentioned earlier), i.e., the distance between an upper end 212U representing the side of the rear curtain 212 located on the −side along the Y axis and extending along the X axis, and a lower end 212B representing the side of the front curtain 211 located on the +side along the Y axis and extending along the X axis, is smaller than the length L0 of the opening 215 along the Y axis. This means that the rear curtain 212 is only able to partially shield the opening 215, i.e., the light shielding range of the rear curtain 212 along the direction of travel is less than the length of opening 215 measured along the direction of travel. The rear curtain 212, which cannot shield the opening 215 in its entirety, is made to move (travel) along the Y axis by the rear curtain drive member 214 as will be described later while its lower end 212B sustains parallelism with the upper end 215U and the lower end 215B of the opening 215. Namely, during a photographing operation, the upper end 211U of the front curtain 211 and the lower end 212B of the rear curtain 212 travel along the Y axis while sustaining parallelism to each other. Since the pixel rows at the image sensor 22 extend along the X axis as explained earlier, the image-capturing signal read direction runs perpendicular to the direction in which the rear curtain 212 travels. It is to be noted that while the embodiment is described by assuming that the rear curtain 212 travels over the front surface (the side toward the subject) of the opening 215, the present invention may be adopted in a mode that includes a curtain traveling over the rear surface (the side toward the image sensor 22) of the opening 215. In addition, a further explanation will be provided later with respect to the length L1 of the front curtain 211 along the Y axis and the length L2 of the rear curtain 212 along the Y axis.

It is to be noted that while the front curtain 211 and the rear curtain 212 in this embodiment are each constituted with a single blade, they may each be constituted with a plurality of blades. In such a case, too, the front curtain 211 and the rear curtain 212 should be structured so that either of them does not shield the opening 215 in its entirety.

The front curtain drive member 213 is configured with a first front curtain drive arm 213a, a second front curtain drive arm 213b, shafts 213c and 213d, and linking pins 213e and 213f. At the ends of the first front curtain drive arm 213a and the second front curtain drive arm 213b located on the +side along the X axis, the front curtain 211 is rotatably fixed through caulking via the linking pins 213e and 213f. The ends of the first front curtain drive arm 213a and the second front curtain drive arm 213b on the −side along the X axis are axially supported at the substrate 210 so as to allow rotation via the shafts 213c and 213d disposed at the front surface of the substrate 210.

In response to a drive signal provided by the control device 26, the first front curtain drive arm 213a and the second front curtain drive arm 213b are engaged in rotational drive respectively centered on the shaft 213c and the shaft 213d over a plane ranging parallel to the XY plane via a drive mechanism (not shown) of the known art configured with an electric motor and a spring. With the first front curtain drive arm 213a and the second front curtain drive arm 213b engaged in rotational drive as described above, the front curtain 211 is made to travel along the Y axis. It is to be noted that the front curtain 211 is set so that it travels toward the +side along the Y axis at a traveling velocity v1.

The rear curtain drive member 214 is configured with a first rear curtain drive arm 214a, a second rear curtain drive arm 214b, shafts 214c and 214d, and linking pins 214e and 214f. At the ends of the first rear curtain drive arm 214a and the second rear curtain drive arm 214b located on the +side along the X axis, the rear curtain 212 is rotatably fixed through caulking via the linking pins 214e and 214f. The ends of the first rear curtain drive arm 214a and the second rear curtain drive arm 214b on the −side along the X axis are axially supported at the substrate 210 so as to allow rotation via the shafts 214c and 214d disposed at the front surface of the substrate 210.

In response to a drive signal provided by the control device 26, the first rear curtain drive arm 214a and the second rear curtain drive arm 214b are engaged in rotational drive respectively centered on the shaft 214c and the shaft 214d over a plane ranging parallel to the XY plane via a drive mechanism (not shown) of the known art configured with an electric motor and a spring. With the first rear curtain drive arm 214a and the second rear curtain drive arm 214b engaged in rotational drive as described above, the rear curtain 212 is made to travel along the Y axis. It is to be noted that the rear curtain 212 is set so that it travels toward the +side along the Y axis at a traveling velocity v2.

Until a photographing instruction is issued in response to a user operation performed at the shutter release button, the front curtain 211 is retained at a front curtain storage position further on the +side along the Y axis relative to the lower end 215B of the opening 215 due to the force imparted by the spring constituting the drive mechanism to the first front curtain drive arm 213a and the second front curtain drive arm 213b. With the spring constituting the drive mechanism for the rear curtain 212 charged, the rear curtain 212 is retained at a rear curtain storage position further on the −side along the Y axis relative to the upper end 215U of the opening 215. Namely, when the front curtain 211 and the rear curtain 212 are stored at their respective storage positions the opening 215 is not shielded from light by the front curtain 211 or the rear curtain 213. Once the user operates the shutter release button, the control device 26 outputs a drive signal to the drive mechanism so as to cause the front curtain 211 to travel to the charge position located on the −side along the Y axis with the drive force imparted by the electric motor and charge the spring at the same time.

Once the front curtain 211 reaches the charge position, the control device 26 outputs a drive signal to the drive mechanism so as to cause the front curtain 211 to start traveling toward the +side along the Y axis with the drive force imparted by the spring so that it is allowed to travel from the charge position to the storage position. When a length of time equivalent to the exposure time elapses after the front curtain 211 starts traveling, the control device 26 outputs a drive signal to the drive mechanism so as to cause the rear curtain 212, currently held at the storage position, toward the +side along the Y axis with the drive force imparted by the spring. The rear curtain 212 continues traveling until the lower end 212B of the rear curtain 212 reaches a position (hereafter referred to as a travel end position) at which the lower end 212B is located further on the +side along the Y axis by a predetermined distance relative to the lower end 215B of the opening 215. Once the read of the image-capturing signals from the image sensor 22 ends, the rear curtain 212 is caused to travel back toward the −side along the Y axis with the drive force imparted by the electric motor until it becomes held at the storage position and at the same time, the spring is charged.

As explained earlier, the lengths L1 and L2 of the front curtain 211 and the rear curtain 212 measured along the Y axis are smaller than the length L0 of sides of the opening 215 measured along the Y axis, and thus, the opening 215 is partially shielded from the subject light flux during a photographing operation even as the front curtain 211 or the rear curtain 212 travels along the Y axis. Accordingly, the control device 26 controls the timing with which the pixels are reset in each of the pixel rows extending along the X axis at the image sensor 22 so as to closely follow the movement of the front curtain 211 traveling along the Y axis. Namely, the control device 26 executes control so that the pixels in a pixel row in the area shielded from the subject light flux by the traveling front curtain 211 are reset. Likewise, the control device 26 controls the timing with which the image-capturing signals are read from each of the pixel rows at the image sensor 22 so as to closely follow the movement of the rear curtain 212 traveling along the Y axis. Specifically, it executes control so that electrical charges are read in a pixel row in the area shielded from the subject light flux by the traveling rear curtain 212.

Next, a method that may be adopted when determining the length of the front curtain 211 along the Y axis and the length L2 of the rear curtain 212 along the Y axis will be explained. It is to be noted that the explanation will be provided by assuming that the traveling velocity v1 of the front curtain 211 and the traveling velocity v2 of the rear curtain 212 are constant.

While the length L1 of the front curtain 211 along the Y axis needs to be set so that a pixel row undergoing a pixel reset, at least, remains shielded from the subject light flux, the minimum length in design can be equalized to the pixel pitch p by matching the traveling velocity v1 of the front curtain 211 with the pixel reset speed determined by the length of time t_reset (which can be set to a desired value under normal circumstances and will hereafter be referred to as a reset time) required to reset pixel rows at the image sensor 22. However, during actual drive of the front curtain 211, it is difficult to perfectly match the traveling velocity v1 of the front curtain 211 with the pixel reset speed and other error factors are bound to exist. Accordingly, the length L1 of the front curtain 211 along the Y axis is determined so as to satisfy the conditions expressed in (1) below.

$$L0 > L1 \geq \Delta L11 \quad (1)$$

It is to be noted that $\Delta L11$ is a constant determined through testing or the like as a margin for manufacturing error pertaining to the front curtain 211 or for any distortion attributable to material strength that may occur as the front curtain 211 travels, a margin set so as to eliminate any influence of light that may enter from the ends of the front curtain 211 facing opposite each other along the Y axis and a margin against any synchronization error that may occur between the pixel reset speed and the traveling velocity v1 of the front curtain 211.

The length L2 of the rear curtain 212 along the Y axis is determined as described below so as to ensure that the subject light flux is not radiated onto the pixels from which the stored electrical charges are being read.

Figure 3:
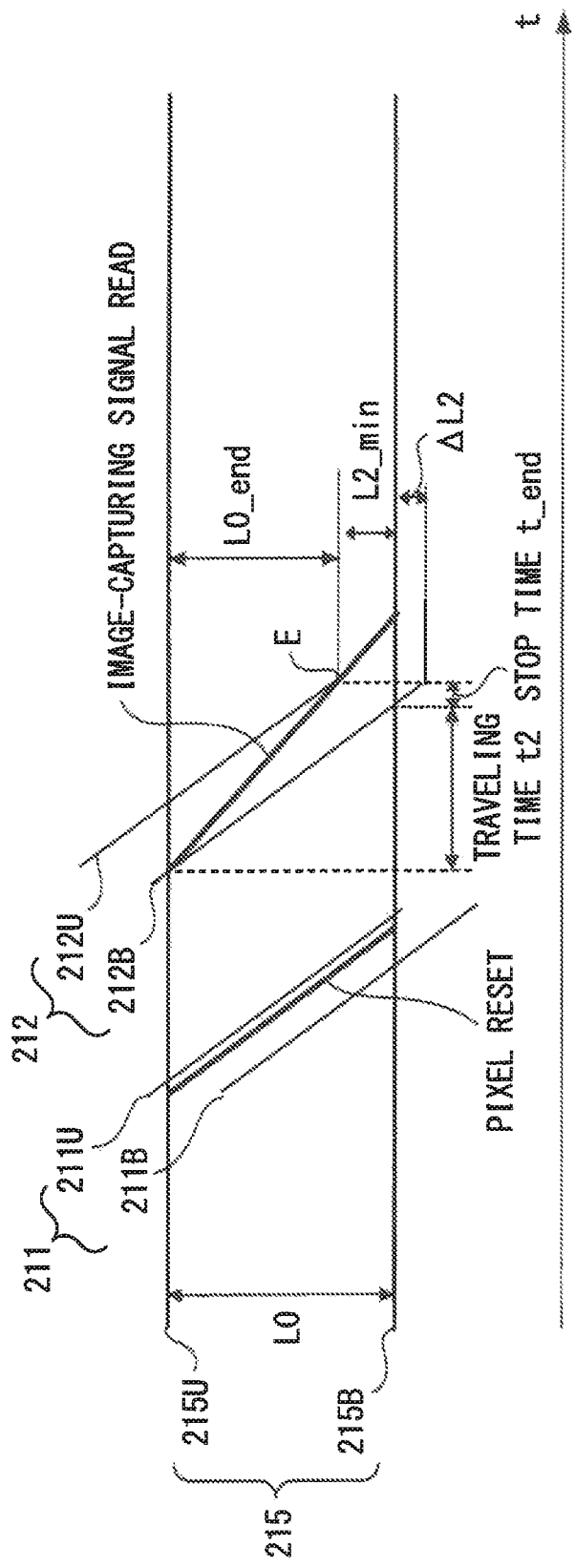

FIG. 3 is a diagram schematically illustrating the relationship among the positions of the upper end 212U and the lower end 212B of the rear curtain 212, the position of the opening 215 and the length of time (read-out time) required to read the image-capturing signals in each of the pixel rows at the image sensor 22. Assuming that v2 represents the traveling velocity of the rear curtain 212 and that L0 represents the length of the opening 215 measured along the Y axis (opening width), the traveling time t2 of the rear curtain 212 is determined as expressed in (2) below.

$$t2 = L0/v2 \quad (2)$$

With t_read representing the read-out time for each pixel row and p representing the pixel pitch at the image sensor 22, the speed with which pixels are read as image-capturing signals is determined as expressed in (3) below.

$$v\_read = p/t\_read \quad (3)$$

It is to be noted that v2>v_read is true under normal circumstances.

At the time point at which the rear curtain 212 finishes traveling, the upper end 212U of the rear curtain 212 must be positioned further upward (further on the −side along the Y axis) relative to the graph representing the image-capturing signal read-out in FIG. 3 in order to ensure that the subject light flux is not radiated onto the pixels undergoing the image-capturing signal read. This means that the line representing the upper end 212U needs to pass through, at least, a point E in FIG. 3. Thus, a length L0_end of the area of the opening 215 that does not need to be shielded by the rear curtain 212, along the Y axis, which is equal to the length of the image-capturing surface along the Y axis, where the image-capturing signal read has been completed when the rear curtain 212 finishes traveling, i.e., the distance between the horizontal line passing through the point E in FIG. 3 and the upper end 215U of e opening 215 in FIG. 3, can be calculated as expressed in (4) below.

$$L0\_end = v\_read \cdot (t2 + t\_end) \quad (4)$$
$$= v\_read \cdot (L0/v2 + \Delta L2/v2)$$
$$= (L0 + \Delta L2) \cdot v\_read/v2$$

t_end above represents the length of time elapsing before the lower end 212B of the rear curtain 212, after passing through the lower end 215B of the opening 215, comes to a stop, which takes on a relationship expressed in (5) below.

$$t\_end = \Delta L2 \cdot v2 \quad (5)$$

A minimum length L2_min that the rear curtain 212 must assume along the Y axis is determined as expressed in (6) below based upon the equations (2) through (5) above.

$$L2\_min = L0 - L0\_end \quad (6)$$
$$= L0 \cdot (1 - v\_read/v2) - \Delta L2 \cdot v\_read/v2$$

As explained earlier, the lower end 212B of the rear curtain 212 travels to the travel end position located further on the +side along the Y axis relative to the lower end 215B of the opening 215 by an extent equal to the predetermined distance $\Delta L2$. Accordingly, L2 of the rear curtain 212 along the Y axis is determined so as to satisfy the conditions expressed in (7) below by factoring in the design minimum length (L2_min+$\Delta L2$) and the margin $\Delta L21$ set for various errors and the like.

$$L0 > L2 \geq L2\_min + \Delta L2 + \Delta L21 = \quad (7)$$
$$L0 \cdot (1 - v\_read/v2) + \Delta L2 \cdot (1 - v\_read/v2) =$$
$$(L0 + \Delta L2) \cdot (1 - v\_read/v2) + \Delta L21$$

It is to be noted that while the explanation is given above by assuming that the blade traveling velocities are constant, an actual blade assumes traveling characteristics whereby it starts at low speed and then gradually increases speed as it travels. However, the concept described above can be adopted in conjunction with such traveling characteristics. Namely, the design minimum lengths for the blade in the front curtain 211 and the blade in the rear curtain 212 (i.e., the minimum lengths of the light shielding ranges of the individual blades along the direction of travel) should be determined as explained earlier by matching the pixel reset speed characteristics with the velocity characteristics of the blade in the front curtain 211 and by determining a point equivalent to the point E in FIG. 3 in conjunction with the blade in the rear curtain 212, with additional measures such as allowing margins for the blade lengths along the direction of travel and the like taken. Furthermore, the concept may be adopted in conjunction with the front curtain 211 and the rear curtain 212, each constituted with a plurality of blades by simply substituting the traveling velocities of last blades in the individual curtains for the lower end 211B of the front curtain 211 and the upper end 212U of the rear curtains 212 respectively.

Next, in reference to FIG. 4, the operation of the shutter device 21 will be described. FIG. 4(a) is a timing chart of operations of the front curtain 211 and the rear curtain 212 executed in response to a photographing instruction issued as the user operates the shutter release button, whereas FIGS. 4(b) through 4(f) each schematically illustrate the positions taken by the front curtain 211 and the rear curtain 212 on the XY plane with specific timing.

As explained earlier, until the user operates the shutter release button and a photographing instruction is issued in response, the front curtain 211 is held at the storage position located further on the +side along the Y axis relative to the lower end 215B of the opening 215 and the rear curtain 212 is held at the storage position located further on the −side along the Y axis relative to the upper end 215U of the opening 215. In other words, up until a time point t0 in FIG. 4(a), neither the front curtain 211 nor the rear curtain 212 shields the opening 215 from the subject light flux, as illustrated in FIG. 4(b). In this state, image-capturing signals are repeatedly read from the image sensor 22 and an image corresponding to the image-capturing signals is displayed as a live view image at the rear monitor 30. At a time point t1 following the shutter release button operation performed at the time point to, the control device 26 outputs a drive signal to the drive mechanism to cause the front curtain 211 to travel toward the −side along the Y axis with the drive force imparted by the electric motor (not shown) and the front curtain 211 reaches the charge position at a time point t2. It is to be noted that, as indicated in FIG. 4(a) or 4(c), the upper end 211U of the front curtain 211 assuming the charge position is set further on the −side along the Y axis relative to the upper end 215U of the opening 215 by a predetermined distance. Namely, part of the front curtain 211 shields part of the opening 215 from the subject light flux.

After the front curtain 211 is charged, the control device 26 outputs a drive signal at a time point t3 so as to cause the front curtain 211 to start traveling toward the +side along the Y axis with the drive force imparted by the spring (not shown) constituting the drive mechanism. Subsequently, as the front curtain 211 travels, the upper end 211U of the front curtain 211 becomes aligned with the upper end 215U of the opening 215 along the Y axis at a time point t5, as indicated in FIGS. 4(a) and 4(d). Subsequently, beyond the time point t5, the subject light flux is allowed to pass through the area between the upper end 211U of the front curtain 211 and the upper end 215U of the opening 215, which is not shielded. Accordingly, at a time point t4, occurring when a predetermined length of time has elapsed following the time point t3, that control device 26 controls the image sensor 22 so as to start a sequential pixel reset, beginning with the pixel row located at the −side end along the Y axis. It is to be noted that the predetermined length of time is set by ensuring that the time point t5 does not occur while the pixel row located at the −side end along the Y axis is undergoing pixel reset at the image sensor 22. The pixels at the image sensor 22 are reset in units of individual pixel rows until a time point t6. Since the length L1 of the front curtain 211 along the Y axis is determined as expressed in (1) as explained earlier, the subject light flux is not radiated onto the pixel row undergoing the pixel reset. Subsequently, the front curtain 211 moves back to the storage position at a time point t7.

Once a length of time corresponding to the exposure time elapses following the time point t3 at which the front curtain 211 starts traveling, the control device 26 outputs a drive signal at a time point t8 so as to cause the rear curtain 212 to start traveling toward the +side along the Y axis with the drive force imparted by the spring constituting the drive mechanism. Subsequently, the lower end 212B of the rear curtain 212 becomes aligned with the lower end 215B of the opening 215 along the Y axis at a time point t10, as indicated in FIGS. 4(a) and 4(e), and then it reaches the travel end position at a time point t11, as indicated in FIGS. 4(a) and 4(f). As is the case with the front curtain 211, the subject light flux is allowed to pass through the area between the upper end 212U of the rear curtain 212 and the upper end 215U of the opening 215, which remains unshielded after the rear curtain 212 starts traveling. Accordingly, at a time point t9, occurring after the rear curtain 212 starts traveling at the time point t8, the control device 26 controls the image sensor 22 so as to start a sequential pixel read, beginning with the pixel row located at the −side end along the Y axis. Since the length L2 of the rear curtain 212 along the Y axis is determined as expressed in (7) as explained earlier, the subject light flux is not radiated onto the pixel row undergoing the pixel read. The image-capturing signal read from the pixel row located at the +side end along the Y axis ends at a time point t12 at the image sensor. At a time point t13 occurring after the image-capturing signal read from all the pixel rows is completed, the control device 26 outputs a drive signal to the drive mechanism so as to cause the rear curtain 212 to travel toward the −side along the Y axis with the drive force imparted by the electric motor (not shown) until it reaches the storage position at a time point t14, and then ends the operational control for the shutter device 21 through the photographing operation.

Figure 5:
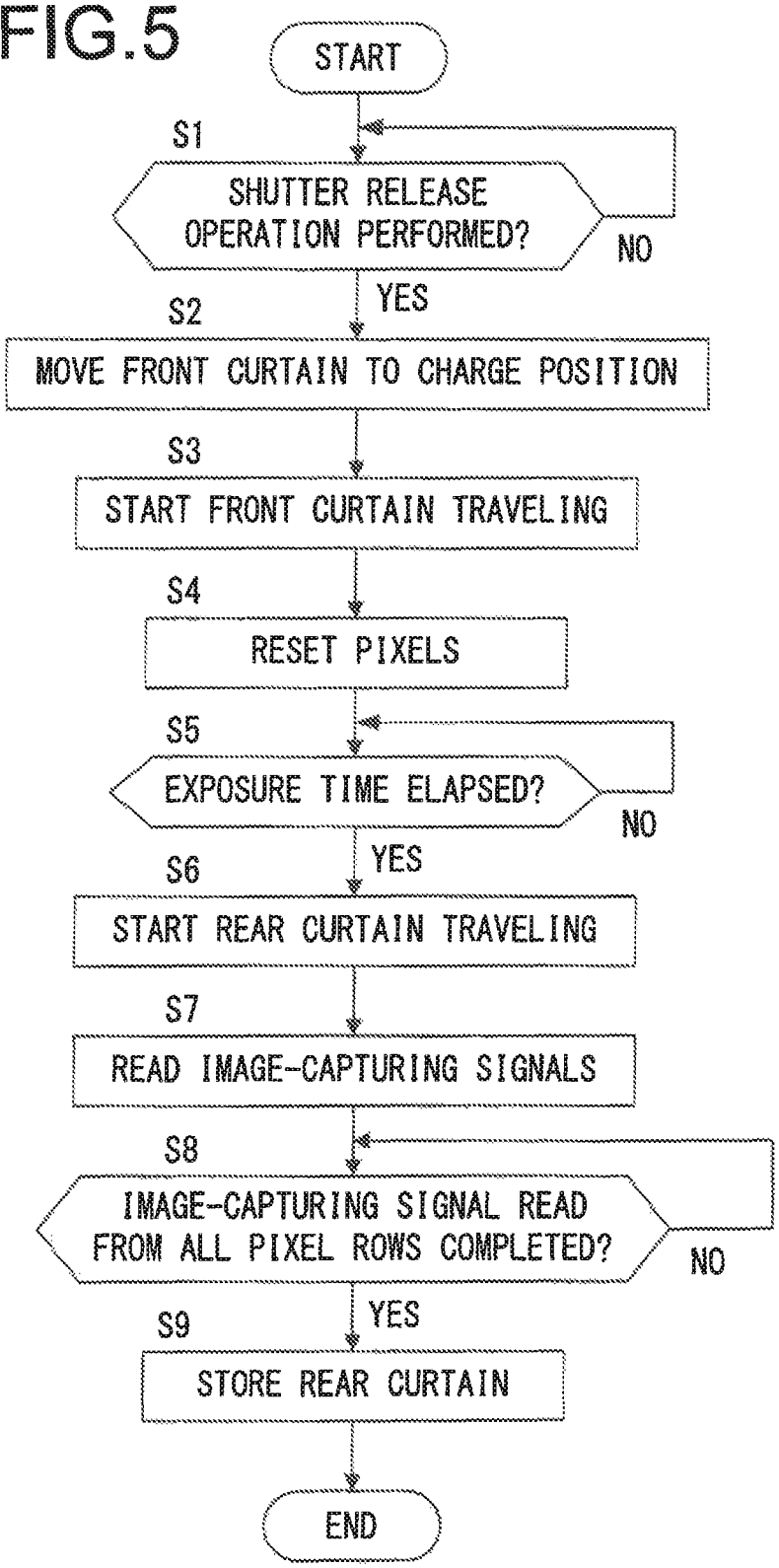

In reference to the flowchart presented in FIG. 5, the operation of the digital camera 1 executed in the first embodiment will be described. The processing in FIG. 5 is enabled by the control device 26 as it executes a program. This program, installed in memory (not shown), is started up and executed by the control device 26.

In step S1, a decision is made as to whether or not the user has pressed the shutter release button all the way down and thus issued a photographing instruction. If an operation signal has been output from the operation unit 40 in response to a full press operation of the shutter release button, an affirmative decision is made in step S1 and the operation proceeds to step S2. If, on the other hand, the shutter release button has not been operated and no operation signal has been output from the operation unit 40, a negative decision is made in step S1 and the processing is repeatedly executed.

In step S2, a drive signal is output so as to cause the front curtain 211 to travel to the charge position via the drive mechanism, before the operation proceeds to step S3. In step S3, the front curtain 211 is caused to start traveling toward the +side along the Y axis, and then the operation proceeds to step S4. Once the predetermined length of time elapses after the front curtain 211 starts traveling, the pixels at the image sensor 22 are sequentially reset in step S4, starting with the pixel row located at the −side end along the Y axis, and then the operation proceeds to step S5.

In step S5, a decision is made as to whether or not the length of time corresponding to the exposure time has elapsed since the front curtain 211 started traveling. If the length of time corresponding to the exposure time has elapsed, an affirmative decision is made in step S5 and the operation proceeds to step S6. If, on the other hand, the length of time corresponding to the exposure time has not elapsed, a negative decision is made in step S5 and the processing is repeatedly executed. In step S6, the rear curtain 212 is caused to start traveling toward the +side of the Y axis and then the operation proceeds to step S7. In step S7, image-capturing signals are sequentially read starting with the pixel row located at the −side end along the Y axis at the image sensor 22, before the operation proceeds to step S8.

In step S8, a decision is made as to whether or not the image-capturing signals have been read from all the pixel rows at the image sensor 22. If the image-capturing signal read from all the pixel rows has been completed, an affirmative decision is made in step S8 and the operation proceeds to step S9. If the image-capturing signal read from all the pixel rows has not been completed, a negative decision is made in step S8 and the processing is repeatedly executed. In step S9, the rear curtain 212 is caused to travel to the storage position before the processing ends.

The following advantages and operations are achieved in the digital camera in the first embodiment described above.

(1) The shutter device 21 in the digital camera 1 includes a front curtain 211, disposed at a position frontward relative to the image-capturing surface of the image sensor 22, which travels along the Y axis, and the rear curtain 212 disposed at a position further frontward relative to the image-capturing surface of the image sensor 22, which travels along the Y axis. The length L1 of the front curtain 211 and the length L2 of the rear curtain 212, measured along the Y axis, are set smaller than the length L0 of the opening 215 measured along the Y axis. Since the front curtain 211 and the rear curtain 212 do not shield the entire range of the opening 215 from light, the areas of the front curtain 211 and the rear curtain 212 can be reduced in comparison to those of front curtains and rear curtains in the related art, which makes it possible to reduce the manufacturing cost and also contribute to weight reduction. In addition, the lighter front curtain 211 and rear curtain 212 can be driven with less power. Furthermore, since lighter front curtain 211 and rear curtain 212 will be subjected to less shock while they travel, their durability can be improved and also the shutter device 21 is allowed to operate more quietly. Moreover, since lighter front curtain 211 and rear curtain 212 can travel faster (with higher traveling velocities), the extent of distortion that is bound to occur in a moving subject image on the photographic image plane during a photographing operation can be reduced so as to assure better image quality and, at the same time, a faster flash sync speed can be achieved.

(2) The front curtain 211 and the rear curtain 212 are each constituted with a single blade. Thus, compared with a front curtain and a rear curtain in the related art, each constituted with a plurality of blades, the number of linking pins 213e, 213f, 214e and 214f required to mount the front curtain 211 and the rear curtain 212 respectively at the front curtain drive member 213 and the rear curtain drive member 214 can be reduced so as to contribute to cost reduction, and at the same time, since the number of caulking areas can be reduced, better productivity can be assured. Furthermore, by reducing the number of linking pins 213e, 213f, 214e and 214f, the weight of the front curtain 211 and the rear curtain 212 can be reduced, and the lighter front curtain 211 and rear curtain 212 can be driven with less power, while at the same time assuring better durability, more quiet operation and higher curtain velocities.

It is to be noted that the advantages and operations described above can be achieved even in conjunction with a front curtain 211 and a rear curtain 212 each constituted with a plurality of blades, as long as they are each structured so as to only partially shield the opening 215 instead of shielding it in its entirety as do the front curtains and the rear curtains in the related art.

(3) The control device 26 controls the image sensor 22 with a plurality of pixels arrayed in a matrix pattern so that pixels are reset in units of individual pixel rows as the front curtain 211 travels along the Y axis and that image-capturing signals are read in units of individual pixel rows as the rear curtain 212 travels along the Y axis. More specifically, the control device 26 controls the image sensor 22 so that the pixels are reset in a pixel row in the area shielded by the front curtain 211 from the light flux advancing from the subject and that the image-capturing signals are read from a pixel row in the area shielded by the rear curtain 212 from the light flux advancing from the subject. Since the front curtain 211 and the rear curtain 212 travel on planes intersecting the optical axis L that are substantially one and the same, unlike a rear curtain and an electronic front curtain shutter system in the related art, which travel over different planes, the occurrence of uneven exposure or image blurring can be prevented, thereby making it possible to improve the quality of the captured image. Moreover, distortion in the image of a moving subject in a captured image, which tends to occur in the rolling shutter system in the related art, can be prevented and the image quality can be further improved as a result.

Second Embodiment

The digital camera achieved in the second embodiment of the present invention will be described next. The following explanation will focus on features distinguishing the current embodiment from the first embodiment with the same reference signs assigned to components identical to those in the first embodiment. Features that are not specially noted are identical to those in the first embodiment. The front curtain in the current embodiment takes a storage position different from that in the first embodiment.

The operation of the shutter device 21 will be described in reference to FIG. 6. FIG. 6(*a*) is a timing chart of operations of the front curtain 211 and the rear curtain 212 executed after a photographing instruction has been issued in response to a user operation of the shutter release button, whereas FIGS. 6(*b*) through 6(*f*) each schematically illustrates the positions taken by the front curtain 211 and the rear curtain 212 on the XY plane with specific timing.

At the shutter device 21 achieved in the embodiment, until the user operates the shutter release button and a photographing instruction is issued, the front curtain 211 and the rear curtain 212 are each held at a storage position at which the curtain does not block the subject light flux, located further on the −side along the Y axis relative to the upper end 215U of the opening 215 with the spring constituting the corresponding drive mechanism set in a charged state, as illustrated in FIG. 6(b). In this state, image-capturing signals are repeatedly read from the image sensor 22 and an image corresponding to the image-capturing signals is displayed as a live view image at the rear monitor 30.

At a time point t3 occurring after the shutter release button is operated at a time point t0, the control device 26 outputs a drive signal to the drive mechanism so as to cause the front curtain 211 to start traveling toward the +side along the Y axis with the drive force imparted by the spring, as illustrated in FIG. 6(a). Subsequently, the control device 26 controls the shutter device 21 and the image sensor 22 as in the first embodiment. Namely, at a time point t4 occurring before a time point t5 at which the upper end 211U of the front curtain 211 becomes aligned with the upper end 215U of the opening 215 along the Y axis, the control device 26 controls the image sensor 22 to start a sequential pixel reset beginning with the pixel row located at the −side end along the Y axis and complete the pixel reset for all the pixel rows by a time point t6, as indicated in FIGS. 6(a) and 6(c).

Once a length of time corresponding to the exposure time elapses following the time point t3 at which the front curtain 211 starts traveling, the control device 26 outputs a drive signal at a time point t8 so as to cause the rear curtain 212 to start traveling toward the +side along the Y axis with the drive force imparted by the spring. Subsequently, the lower end 212B of the rear curtain 212 becomes aligned with the lower end 215B of the opening 215 along the Y axis at a time point t10, as indicated in FIGS. 6(a) and 6(d), and then it reaches the travel end position at a time point t11, as indicated in FIGS. 6(a) and 6(e). At a time point t9, occurring after the rear curtain 212 starts traveling at the time point t8, the control device 26 controls the image sensor 22 so as to start a sequential pixel read, beginning with the pixel row located at the −side end along the Y axis. The image-capturing signal read from the pixel row located at the +side end along the Y axis ends at a time point t12 at the image sensor 22.

At a time point t13 occurring after the image-capturing signal read from all the pixel rows is completed, the control device 26 drives the front curtain 211 and the rear curtain 212 toward the −side along the Y axis to their respective storage positions with drive forces imparted by the electric motors constituting the respective drive mechanisms and thus charges the respective springs. In the example presented in FIG. 6(a), the rear curtain 212 reaches its storage position at a time point t14 and the front curtain 211 reaches its storage position at a time point t15. It is to be noted that the present invention is not limited to an example in which the front curtain 211 and the rear curtain 212 are caused to start moving toward their storage positions simultaneously at the time point t13, and the present invention may instead be adopted in a mode whereby the timing with which the front curtain 211 starts moving toward its storage position is different from the timing with which the rear curtain 212 starts moving toward its storage position. In such a case, the front curtain 211 may start traveling ahead of the rear curtain 212, or vice versa. In addition, the rear curtain 212 and the front curtain 211 do not need to reach their respective storage positions in this order, and instead, the present invention may be adopted in a mode Whereby the front curtain 211 and the rear curtain 212 reach their storage positions in this order or in a mode whereby the front curtain 211 and the rear curtain 212 reach their storage positions at substantially the same time.

The control device 26 in the digital camera 1 achieved in the embodiment engages the shutter device 21 in operation through processing similar to that described in reference to the flowchart in FIG. 5. However, it does not execute the processing in step S2 (the front curtain 211 is caused to travel toward the charge position) in the flowchart presented in FIG. 5, and instead, the front curtain 211 and the rear curtain 212 move to their respective storage positions in step S9.

In addition to the advantages and operations achieved in the first embodiment, the digital camera in the second embodiment described above offers the following advantage and operation.

Namely, since the front curtain 211, held at the storage position located further on the +side along the Y axis relative to the lower end 215B of the opening 215, does not need to travel to the charge position following a shutter release button operation, a smaller shutter release time lag can be achieved compared to the first embodiment.

Third Embodiment

The digital camera achieved in the third embodiment of the present invention will be described next. The following explanation will focus on features distinguishing the current embodiment from the first embodiment with the same reference signs assigned to components identical to those in the first embodiment. Features that are not specially noted are identical to those in the first embodiment. The current embodiment is distinguishable from the first embodiment in that the size of the image-capturing area at the image sensor is smaller than the a real size of the opening.

Figure 7:
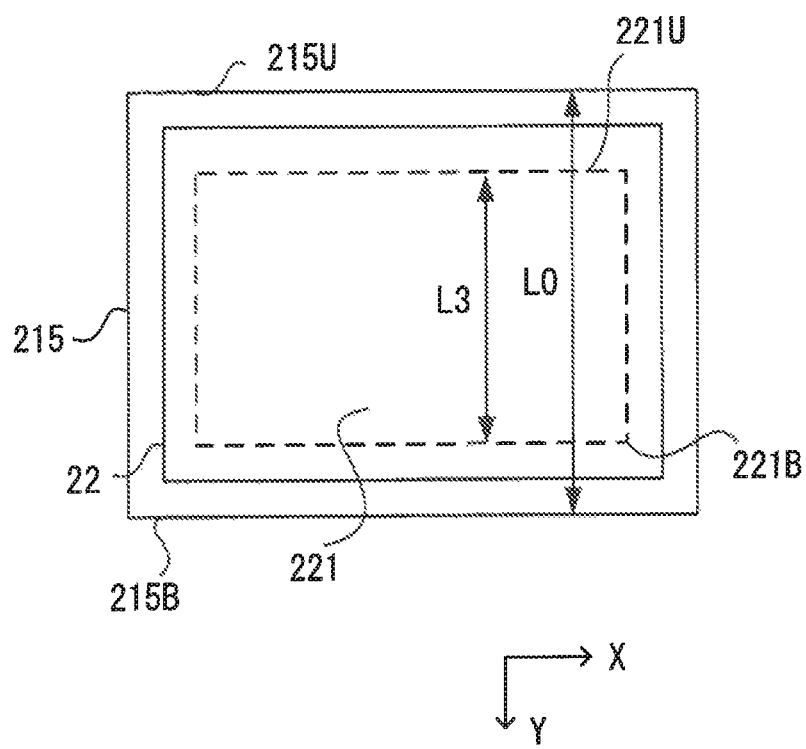

The relationship between the opening 215 and an image-capturing area 221 at the image sensor 22 is illustrated in a schematic plan view in FIG. 7, with a coordinate system assuming an X axis and Y axis defined as in FIG. 2. As FIG. 7 indicates, the image-capturing area 221 at the image sensor 22 in the embodiment is set so as to fit within a rectangular area enclosed by the dotted line. Namely, a length L3 representing the distance between an end (hereafter referred to as an upper end) 221U of the image-capturing area 221 located on the −side along the Y axis, and an end (hereafter referred to as a lower end) 221B of the image-capturing area 221 located on the +side along the Y axis measured along the Y axis, is set smaller than the length L0 of the opening 215 along the Y axis.

Since the length L3 of the image-capturing area 221 along the Y axis is set smaller than the length L0 of the opening 215 along the Y axis, the length L2 of the rear curtain 212 in the embodiment can be set so as to satisfy the conditions set forth in (8) below.

$$L0 > L2 \geq (L3 + \Delta L2) \cdot (1 - v\_read/v2) + \Delta L21 \quad (8)$$

It is to be noted that ΔL21 in (8) above, represents the distance measured from the lower end 221B of the image-capturing area 221 to the travel end position at which the lower end 212B of the rear curtain 212.

In reference to FIG. 8, the operation of the shutter device 21 in the embodiment structured as described above will be described. FIG. 8(a) is a timing chart of operations of the front curtain 211 and the rear curtain 212 executed in response to a photographing instruction issued as the user operates the shutter release button, whereas FIGS. 8(b) through 8(f) each schematically illustrates the positions taken by the front curtain 211 and the rear curtain 212 on the XY plane with specific timing.

In this embodiment, too, the front curtain 211 is held at the storage position located toward the lower end 215B of the opening 215 and the rear curtain 212 is held at the storage position located toward the upper end 215U of the opening 215 until the shutter release button is operated, as in the first embodiment. In this state, image-capturing signals are repeatedly read from the image sensor 22 and an image corresponding to the image-capturing signals is displayed as a live view image at the rear monitor 30. At a time point t1 following the shutter release button operation performed at a time point t0, the control device 26 outputs a drive signal to the drive mechanism to cause the front curtain 211 to start traveling toward the charge position located further on the −side along the Y axis with the drive force imparted by the electric motor. The front curtain 211 reaches the charge position, at which the spring is charged, at a time point t2. It is to be noted that, as indicated in FIG. 8(a) or 8(c), the upper end 211U of the front curtain 211 assuming the charge position is set further on the −side along the Y axis relative to the upper end 215U of the opening 215 by a predetermined distance. Namely, part of the front curtain 211 shields part of the opening 215 and part of the image-capturing area 221 of the image sensor 22 from the subject light flux.

After the front curtain 211 is charged, the control device 26 outputs a drive signal at a time point t3 so as to cause the front curtain 211 to start traveling toward the +side along the Y axis with the drive force imparted by the spring. Subsequently, as the front curtain 211 travels, the upper end 211U of the front curtain 211 becomes aligned with the upper end 221U of the image-capturing area 221 along the Y axis at a time point t5, as indicated in FIGS. 8(a) and 8(d). Beyond the time point t5, the subject light flux is allowed to pass through the area between the upper end 211U of the front curtain 211 and the upper end 221U of the image-capturing area 221, which is not shielded. Accordingly, at a time point t4, occurring when a predetermined length of time has elapsed following the time point t3, the control device 26 controls the image sensor 22 so as to start a sequential pixel reset, beginning with the pixel row located at the upper end 221U of the image-capturing area 221. The pixels at the image sensor 22 are reset in units of individual pixel rows until a time point t6. Since the length L1 of the front curtain 211 along the Y axis is determined as expressed in (1) as explained earlier, the subject light flux is not radiated onto the pixel row undergoing the pixel reset. Subsequently, the front curtain 211 moves back to the storage position at a time point t7.

Once a length of time corresponding to the exposure time elapses following the time point t3 at which the front curtain 211 starts traveling, the control device 26 outputs a drive signal at a time point t8 so as to cause the rear curtain 212 to start traveling toward the +side along the Y axis with the drive force imparted by the spring. Subsequently, the lower end 212B of the rear curtain 212 becomes aligned with the lower end 221B of the image-capturing area 221 along the Y axis at a time point t10, as indicated in FIGS. 8(a) and 8(e), and then it reaches the travel end position at a time point t11, as indicated in FIGS. 8(a) and 8(f). As is the case with the front curtain 211, the subject light flux is allowed to pass through the area between the upper end 212U of the rear curtain 212 and the upper end 221U of the image-capturing area 221, which remains unshielded after the rear curtain 212 starts traveling. Accordingly, at a time point t9, occurring after the rear curtain 212 starts traveling at the time point t8, the control device 26 controls the image sensor 22 so as to start a sequential pixel read, beginning with the pixel row located at the upper end 221U of the image-capturing area 221.

Since the length L2 of the rear curtain 212 along the Y axis is determined as expressed in (7), the subject light flux is not radiated onto the pixel row undergoing the pixel read. The image-capturing signal read from the pixel row located at the lower end 221B of the image-capturing 221 ends at a time point t12 at the image sensor 22. At a time point t13 occurring after the image-capturing signal read from all the pixel rows is completed, the control device 26 causes the rear curtain 212 to travel toward the −side along the Y axis with the drive force imparted by the electric motor until it reaches the storage position and the spring in the drive mechanism is charged at a time point t14, and then ends the operational control for the shutter device 21 through the photographing operation.

In addition to the advantages and operations (2) and (3) achieved in the first embodiment, the digital camera in the third embodiment described above offers the following advantage and operation.

The shutter device 21 in the digital camera 1 includes a front curtain 211 located further frontward relative to the image-capturing surface of the image sensor 22, which travels along the Y axis, and a rear curtain 212 located further frontward relative to the image-capturing surface of the image sensor 22, which travels along the Y axis. The length L1 of the front curtain 211 measured along the Y axis and the length L2 of the rear curtain 212 measured along the Y axis are smaller than the length L3 of the image-capturing area 221 at the image sensor 22 measured along the Y axis. ΔL2 may be set substantially equal to that in the first embodiment. Accordingly, a further reduction is achieved in the weight of the front curtain 211 and the rear curtain 212 over the first embodiment, which makes it possible to further reduce the manufacturing cost and the power consumption, improve the durability, enable quieter operation and contribute to higher curtain velocities.

It is to be noted that instead of holding the front curtain 211 at the storage position located toward the lower end 215B of the opening 215, the present invention may be adopted in a mode whereby the front curtain 211 and the rear curtain 212 are held at storage positions each located further toward the upper end 215U of the opening 215, as in the second embodiment. In this mode, since the front curtain 211 does not need to travel to the charge position following a shutter release button operation, a shorter shutter release time lag is assured, as in the second embodiment.

Fourth Embodiment

The digital camera achieved in the fourth embodiment of the present invention will be described next. The following explanation will focus on features distinguishing the current embodiment from the first embodiment with the same reference signs assigned to components identical to those in the first embodiment. Features that are not specially noted are identical to those in the first embodiment. The current embodiment is distinguishable from the first embodiment in that the positions of the front curtain and the rear curtain are detected while they travel and the timing for the pixel reset start and the timing for the image-capturing read start are controlled based upon the detected positions.

Figure 9:
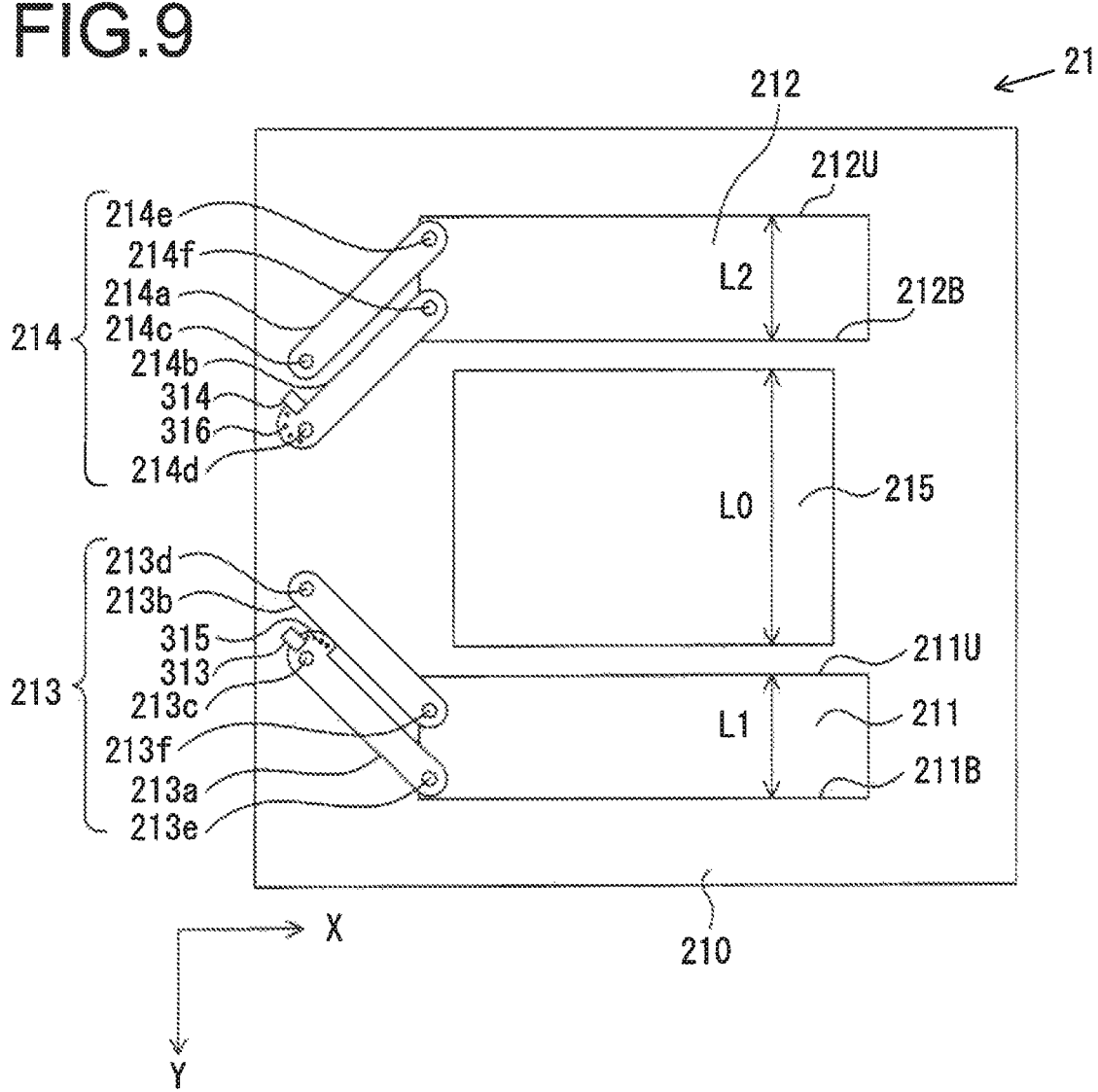

The shutter device 21 achieved in the embodiment is schematically illustrated in a plan view in FIG. 9. It is to be noted that a coordinate system assuming an X axis and a Y axis, similar to that in FIG. 2, is set as shown in the figure.

As FIG. 9 indicates, a front curtain position detector 313 used to detect the position of the first front curtain drive arm 213a and a rear curtain position detector 314 used to detect the position of the second rear curtain drive arm 214b are mounted at the substrate 210 of the shutter device 21. The front curtain position detector 313, which may be constituted with, for instance, a photo-interrupter, outputs a pulse signal to the control device 26 each time it detects one of a plurality of small holes 315 formed in a row along the direction in which the first front curtain drive arm 213a rotates. The rear curtain position detector 314, which may be constituted with, for instance, a photo-interrupter, outputs a pulse signal to the control device 26 each time it detects one of a plurality of small holes 316 formed in a row along the direction in which the second rear curtain drive arm 214b rotates.

Based upon a string of pulse signals sequentially output from the front curtain position detector 313 and input thereto, the control device 26 is able to detect the position of the lower end 211B or the upper end 211U of the front curtain 211 assumed along the Y axis in reference to the storage position. After the front curtain 211 starts traveling from the charge position toward the +side along the Y axis, the control device 26 starts a pixel reset in units of individual pixel rows at the image sensor 22 upon deciding that the detected position of front curtain 211 matches a predetermined position. It is to be noted that a preselected position at which the light flux from the subject is not radiated on the pixel row undergoing the pixel reset even while the front curtain 211 is traveling toward the +side along the Y axis is designated as the predetermined position for the front curtain 211.

Based upon a string of pulse signals sequentially output from the rear curtain position detector 314 and input thereto, the control device 26 is able to detect the position of the lower end 212B or the upper end 212U of the rear curtain 212 assumed along the Y axis in reference to the storage position. After the rear curtain 212 starts traveling from the storage position toward the +side along the Y axis, the control device 26 starts an image-capturing signal read in units of individual pixel rows at the image sensor 22 upon deciding that the detected position of rear curtain 212 matches a predetermined position. It is to be noted that a preselected position at which the light flux from the subject is not radiated on the pixel row undergoing the image-capturing signal read even while the rear curtain 212 is traveling toward the +side along the Y axis is designated as the predetermined position for the rear curtain 212.

Figure 10:
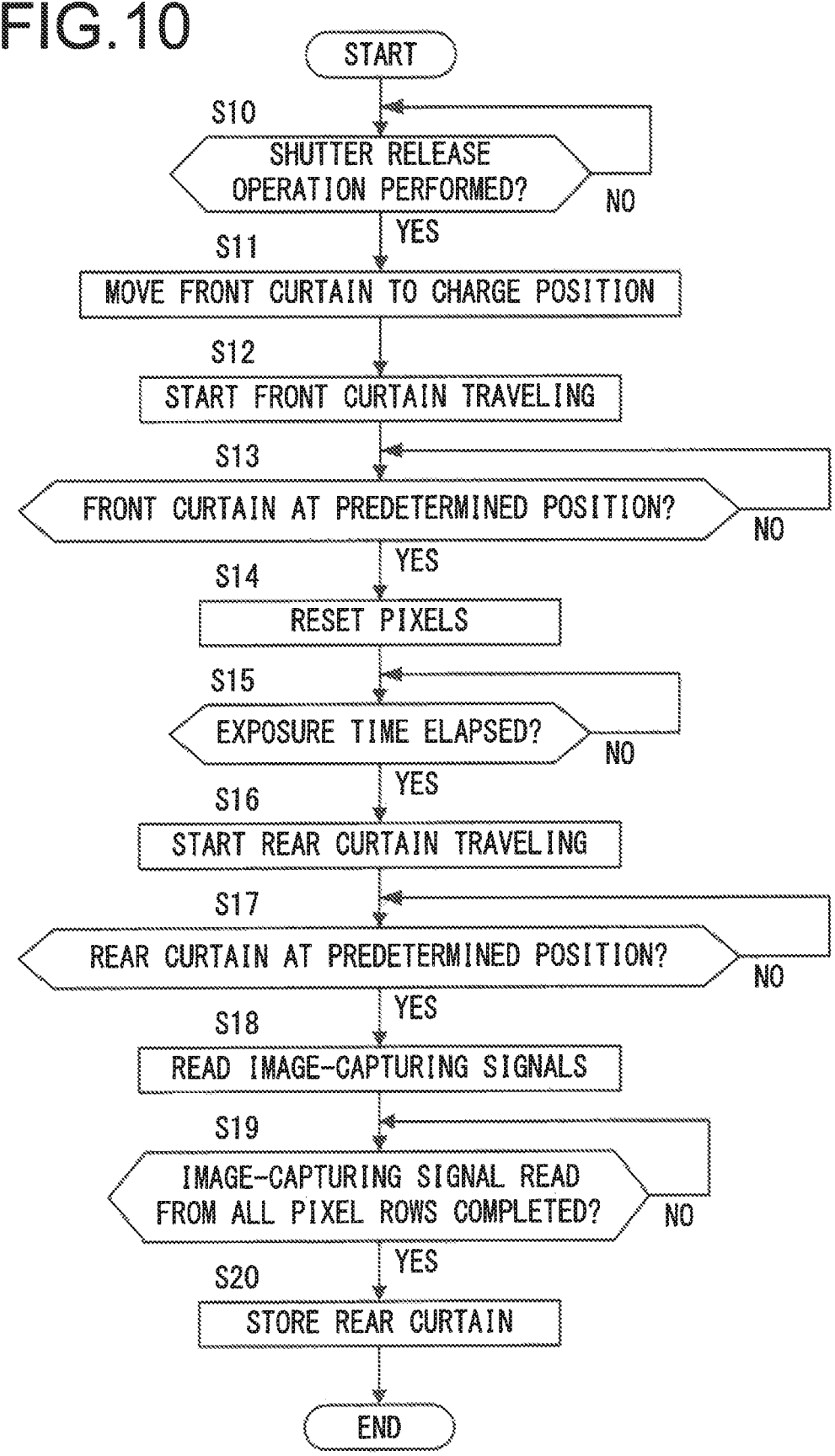

In reference to the flowchart presented in FIG. 10, the operation of the digital camera 1 executed in the fourth embodiment will be described. The processing in FIG. 10 is enabled by the control device 26 as it executes a program. This program, installed in memory (not shown), is started up and executed by the control device 26.

In step S10 (in which a decision is made as to whether or not the shutter release button has been operated) through step S12 (in which the front curtain 211 starts traveling), processing similar to that executed in step S1 (in which a decision is made as to whether or not the shutter release button has been operated) through step S3 (in which the front curtain 211 starts traveling) in FIG. 5 is executed. In step S13, a decision is made as to whether or not the position assumed by the front curtain 211 along the Y axis is the predetermined position. If the front curtain 211 has reached the predetermined position, an affirmative decision is made in step S13 and the operation proceeds to step S14. If, on the other hand, the front curtain 211 has not reached the predetermined position, a negative decision is made in step S13 and the processing is repeatedly executed.

In step S14 (in which pixels are reset) through step S16 (in which the rear curtain 212 starts traveling), processing similar to that executed in step S4 (in which the pixels are reset) through step S6 (in which the rear curtain 212 starts traveling) in FIG. 5, is executed. In step S17, a decision is made as to whether or not the position assumed by the rear curtain 212 along the Y axis is the predetermined position. If the rear curtain 212 has reached the predetermined position, an affirmative decision is made in step S17 and the operation proceeds to step S18. If, on the other hand, the rear curtain 212 has not reached the predetermined position, a negative decision is made in step S17 and the processing is repeatedly executed. In step S18 (in which the image-capturing signals are read) through step S20 (in which the rear curtain 212 returns to the storage position), processing similar to that executed in step S7 (in which the image-capturing signals are read) through step S9 (in which the rear curtain 212 returns to the storage position) in FIG. 5 is executed.

In addition to the advantages and operations achieved in the first embodiment, the digital camera in the fourth embodiment described above has the following advantage and operation.

The front curtain position detector 313 detects the position currently taken by the front curtain 211 as it travels along the Y axis, and the control device 26 controls the image sensor 22 so as to start a pixel reset in units of individual pixel rows if the detected position of the front curtain 211 matches a predetermined position. In addition, the rear curtain position detector 314 detects the position currently taken by the rear curtain 212 as it travels along the Y axis, and the control device 26 controls the image sensor 22 so as to start an image-capturing signal read in units of individual pixel rows if the detected position of the rear curtain 212 matches a predetermined position. Thus, even if changes occur in the traveling velocity v1 of the front curtain 211 and the traveling velocity v2 of the rear curtain 212 due to degradation over time, the pixel row undergoing the pixel reset and the pixel row undergoing the charge read can be shielded from the subject light flux. Namely, the curtains can be designed with smaller margins ΔL11 and ΔL21 set for the blades.

It is to be noted that instead of holding the front curtain 211 at the storage position located toward the lower end 215B of the opening 215, the present invention may be adopted in a mode whereby the front curtain 211 and the rear curtain 212 are held at storage positions each located further toward the upper end 215U of the opening 215, as in the second embodiment. In this mode, since the front curtain 211 does not need to travel to the charge position following a shutter release button operation, a shorter shutter release time lag is assured, as in the second embodiment.

The following variations are also within the scope of the present invention and one of the variations or a plurality of them may be adopted in conjunction with an embodiment described earlier.

(1) A shutter device 21 with the front curtain 211 thereof formed with a length L1 satisfying the conditions set forth in (1) and the rear curtain 212 thereof formed with a length that allows it to shield the entire range of the opening 215 from light or a shutter device 21 with the front curtain 211 thereof formed with a length that allows it to shield the entire range of the opening 215 from light and the rear curtain 212 thereof formed with a length satisfying the conditions set forth in (7) or (8) also embodies the present invention. A digital camera 1 equipped with such a shutter device 21 also constitutes a mode of the present invention.

(2) The curtains may each be constituted with a plurality of blades instead of a single blade. In such a case, too, the front curtain 211 should be formed so that its length L1 along the Y axis satisfies the conditions set forth in (1) and the rear curtain 212 should be formed so that its length L2 along the Y axis satisfies the conditions set forth in (7) or (8), as explained earlier.

As long as features characterizing the present invention remain intact, the present invention is in no way limited to the particulars of the embodiments described earlier and other modes conceivable within the scope of the technical teachings of the present invention are within the scope of the present invention.

The disclosure of the following priority application is herein incorporated by reference:
Japanese Patent Application No. 2014-63363 filed Mar. 26, 2014

REFERENCE SIGNS LIST

1 . . . Digital camera, 21 . . . Shutter device, 22 . . . image-capturing device, 26 . . . Control device, 210 . . . Substrate, 211 . . . Front curtain, 212 . . . Rear curtain, 213 . . . Front curtain drive member, 214 . . . Rear curtain drive member, 215 . . . Opening, 221 . . . image-capturing area, 313 . . . Front curtain position detector, 314 . . . Rear curtain position detector

The invention claimed is:

1. A shutter device comprising:
a first light shielding member that, by traveling along a first direction at a side toward a subject over an image-capturing surface of an image sensor, changes a state of each area on the image-capturing surface that is shielded from the side toward the subject into a state of the area that is opened to the side toward the subject; and
a second light shielding member that, by traveling along the first direction at the side toward the subject over the image-capturing surface, changes the state of the area that is opened to the side toward the subject by traveling of the first light shielding member into a state of the area that is shielded from the side toward the subject, wherein:
the first light shielding member is constituted so that the image-capturing surface has the area that is opened to the side toward the subject without being shielded from the side toward the subject by the first light shielding member in a traveling direction of the first light shielding member while the first light shielding member travels along the first direction at the side toward the subject over the image-capturing surface.

2. The shutter device according to claim 1, wherein:
at least one of the first light shielding member and the second light shielding member is constituted with a single light shielding blade.

3. An image-capturing device comprising:
the shutter device according to claim 1;
the image sensor having a plurality of pixels arrayed in a matrix pattern; and
a control unit that controls a reset and an image-capturing signal read executed in each of pixel rows at the image sensor, wherein:
the control unit engages the image sensor in the reset executed in each of pixel rows in correspondence to travel of the first light shielding member along the first direction, or engages the image sensor in the image-capturing signal read executed in each of pixel rows in correspondence to travel of the second light shielding member along the first direction.

4. The image-capturing device according to claim 3, wherein:
the control unit executes control so that the reset is executed on a pixel row in an area shielded from the side toward the subject by the first light shielding member.

5. The image-capturing device according to claim 4, wherein:
the shutter device further comprises a first drive mechanism that causes the first light shielding member to travel at a first velocity along the first direction, and
the length of the light shielding range of the first light shielding member measured along the first direction is greater than a length determined based upon the first velocity and a length of time required to execute the reset in each of pixel rows.

6. The image-capturing device according to claim 5, wherein:
the shutter device further comprises a first detection unit that detects a position of the first light shielding member traveling along the first direction, and
the control unit controls timing with which the reset executed in each of pixel rows starts based upon the position detected by the first detection unit.

7. The image-capturing device according to claim 3, wherein:
the control unit executes control so that the image-capturing signal read is executed on a pixel row in an area shielded from the side toward the subject by the second light shielding member.

8. The image-capturing device according to claim 7, wherein:
the shutter device further comprises a second drive mechanism that causes the second light shielding member to travel at a second velocity along the first direction, and
the length of the light shielding range of the second light shielding member measured along the first direction is greater than a length determined based upon the second velocity, a length of time required to execute the image-capturing signal read in each of pixel rows and the length of the image-capturing surface along the first direction.

9. The image-capturing device according to claim 8, wherein:
the shutter device further comprises a second detection unit that detects a position of the second light shielding member traveling along the first direction, and
the control unit controls timing with which the image-capturing signal read executed in each of pixel rows starts based upon the position detected by the second detection unit.

10. A shutter device comprising:
a first light shielding member that, by traveling along a first direction at a side toward a subject over an image-capturing surface of the image sensor, changes a state of each area on the image-capturing surface that is shielded from the side toward the subject into a state of the area that is opened to the side toward the subject; and
a second light shielding member that, by traveling along the first direction at the side toward the subject over the image-capturing surface, changes the state of the area that is opened to the side toward the subject by traveling of the first light shielding member into a state of the area that is shielded from the side toward the subject, wherein:

the second light shielding member is constituted so that the image-capturing surface has the area that is opened at the side toward the subject without being shielded from the side toward the subject by the second light shielding member at an opposite side of a traveling direction of the second light shielding member while the second light shielding member travels along the first direction at the side toward the subject over the image-capturing surface.

11. The shutter device according to claim 10, wherein:

a length of the image-capturing surface of the image sensor along the first direction is smaller than the length of an opening along the first direction, and at least one of the length of a light shielding range of the first light shielding member, measured along the first direction, and the length of a light shielding range of the second light shielding member, measured along the first direction, is smaller than the length of the image-capturing surface along the first direction.

* * * * *